US012382946B2

(12) United States Patent
Walsh et al.

(10) Patent No.: US 12,382,946 B2
(45) Date of Patent: *Aug. 12, 2025

(54) RETRACTING TUNNEL RODENT TRAP

(71) Applicant: OMS Investments, Inc., Los Angeles, CA (US)

(72) Inventors: James R. Walsh, Wauwatosa, WI (US); Daniel C. Johnson, Madison, WI (US)

(73) Assignee: OMS Investments, Inc., Los Angeles, CA (US)

(*) Notice: Subject to any disclaimer, the term of this patent is extended or adjusted under 35 U.S.C. 154(b) by 218 days.

This patent is subject to a terminal disclaimer.

(21) Appl. No.: 17/536,488

(22) Filed: Nov. 29, 2021

(65) Prior Publication Data

US 2022/0174936 A1 Jun. 9, 2022

Related U.S. Application Data

(60) Continuation of application No. 16/724,219, filed on Dec. 21, 2019, now Pat. No. 11,185,066, which is a continuation of application No. 14/946,927, filed on Nov. 20, 2015, now Pat. No. 10,512,259, which is a division of application No. 13/738,008, filed on Jan. 10, 2013, now Pat. No. 9,220,256.

(51) Int. Cl.
*A01M 23/36* (2006.01)
*A01M 23/30* (2006.01)

(52) U.S. Cl.
CPC ............ *A01M 23/36* (2013.01); *A01M 23/30* (2013.01)

(58) Field of Classification Search
CPC ....... A01M 23/24; A01M 23/30; A01M 23/36
USPC ............................................. 43/77–79, 81–83
See application file for complete search history.

(56) References Cited

U.S. PATENT DOCUMENTS

| 282,463 | A | * | 7/1883 | Lutz | A01M 23/30 |
| | | | | | 246/33 |
| 2,005,489 | A | | 6/1935 | William | |
| 2,148,813 | A | * | 2/1939 | Hosmer | A01M 23/24 |
| | | | | | 43/78 |

(Continued)

FOREIGN PATENT DOCUMENTS

DE 826375 C * 1/1952
EP 0745323 A1 * 12/1996

(Continued)

*Primary Examiner* — Darren W Ark
(74) *Attorney, Agent, or Firm* — Frost Brown Todd LLP

(57) ABSTRACT

A rodent trap includes a base, a strike member, a biasing member, and a trigger. The base defines a base interior and an opening. The strike member is movably coupled to the base for linear travel between an extended position and a retracted position. The strike member comprises a tunnel element extending through the opening of the base. The strike member defines an entryway that communicates with the base interior. The biasing member is coupled to the base and the strike member. The biasing member is configured to bias the strike member toward the retracted position. The trigger is movably coupled to the base. The trigger is configured to contact an outer surface of the strike member in the extended position. When the trigger dislodges from the outer surface of the strike member, the strike member linearly travels to the retracted position.

19 Claims, 3 Drawing Sheets

(56) References Cited

U.S. PATENT DOCUMENTS

| | | | | |
|---|---|---|---|---|
| 2,151,046 A * | 3/1939 | Porciuncula | A01M 23/00 | 43/60 |
| 4,026,064 A * | 5/1977 | Baker | A01M 25/004 | 43/131 |
| 4,127,958 A * | 12/1978 | Peters | A01M 23/20 | 43/81 |
| 4,231,180 A * | 11/1980 | Bare | A01M 23/02 | 43/61 |
| 4,291,486 A * | 9/1981 | Lindley | A01M 23/16 | 43/61 |
| 4,418,493 A * | 12/1983 | Jordan | A01M 23/18 | 43/67 |
| 4,453,337 A * | 6/1984 | Williams | A01M 25/004 | 119/51.01 |
| 4,550,524 A * | 11/1985 | Goebel | A01M 23/02 | 43/75 |
| 4,550,525 A * | 11/1985 | Baker | A01M 25/004 | 43/131 |
| 4,658,536 A * | 4/1987 | Baker | A01M 25/004 | 43/131 |
| 4,660,320 A * | 4/1987 | Baker | A01M 25/004 | 43/131 |
| 4,769,942 A * | 9/1988 | Copenhaver, Sr. | A01M 25/004 | 43/61 |
| 4,858,373 A * | 8/1989 | Combs | A01M 23/22 | 43/79 |
| 4,949,499 A * | 8/1990 | Lindros, Jr. | A01M 23/16 | 43/67 |
| 5,005,313 A * | 4/1991 | Lindros, Jr. | A01M 23/16 | 43/67 |
| 5,040,327 A * | 8/1991 | Stack | A01M 25/004 | 43/131 |
| 5,044,111 A * | 9/1991 | Lindros, Jr. | A01M 23/16 | 43/67 |
| 5,044,113 A * | 9/1991 | Stack | A01N 25/004 | 426/1 |
| 5,136,803 A * | 8/1992 | Sykes | A01M 25/004 | 43/131 |
| 5,175,957 A * | 1/1993 | West | A01M 23/16 | 43/61 |
| 5,272,832 A * | 12/1993 | Marshall | A01M 25/004 | 43/131 |
| 5,448,852 A * | 9/1995 | Spragins | A01M 25/004 | 43/131 |
| 5,481,824 A * | 1/1996 | Fiore, Jr. | A01M 23/34 | 43/81 |
| 5,806,237 A * | 9/1998 | Nelson | A01M 25/004 | 43/131 |
| 5,960,585 A * | 10/1999 | Demarest | A01M 1/2011 | 43/131 |
| 6,029,393 A * | 2/2000 | Stewart | A01M 23/18 | 43/60 |
| 6,082,042 A * | 7/2000 | Issitt | A01M 25/004 | 229/116 |
| 6,145,242 A * | 11/2000 | Simpson | A01M 25/004 | 43/131 |
| 6,272,791 B1 * | 8/2001 | Pleasants | A01M 25/004 | 43/131 |
| 6,397,517 B1 * | 6/2002 | Leyerle | A01M 23/24 | 43/88 |
| 6,493,988 B1 * | 12/2002 | Johnson | A01M 25/004 | 43/131 |
| 6,513,283 B1 * | 2/2003 | Crossen | A01M 25/004 | 43/131 |
| 6,807,768 B2 * | 10/2004 | Johnson | A01M 25/004 | 43/131 |
| 7,231,738 B2 * | 6/2007 | Watson | A01M 23/18 | 43/67 |
| 7,607,254 B1 * | 10/2009 | Huang | A01M 23/16 | 43/88 |
| 7,669,363 B2 * | 3/2010 | Frisch | A01M 25/004 | 43/131 |
| 7,784,216 B2 * | 8/2010 | Kaukeinen | A01M 25/004 | 43/132.1 |
| 7,886,479 B2 * | 2/2011 | Bruno | A01M 23/08 | 43/67 |
| 7,987,629 B2 * | 8/2011 | Harper | A01M 25/004 | 43/131 |
| 8,209,900 B2 * | 7/2012 | Vickery | E05B 35/008 | 43/131 |
| 8,800,201 B2 * | 8/2014 | Vickery | A01M 25/002 | 43/131 |
| 9,220,256 B2 * | 12/2015 | Walsh | A01M 23/36 | |
| 9,374,993 B2 * | 6/2016 | Smith | A01M 23/36 | |
| 10,512,259 B2 * | 12/2019 | Walsh | A01M 23/36 | |
| 10,736,311 B2 * | 8/2020 | Meissner | A01M 23/24 | |
| 10,863,733 B2 * | 12/2020 | McGuire, II | A01M 23/02 | |
| 11,185,066 B2 * | 11/2021 | Walsh | A01M 23/30 | |
| 2004/0244274 A1 * | 12/2004 | Dellevigne | A01M 25/004 | 43/131 |
| 2005/0000489 A1 * | 1/2005 | Fuwa | F02D 41/18 | 123/347 |
| 2005/0028431 A1 * | 2/2005 | Hoyes | A01M 25/004 | 43/131 |
| 2005/0284015 A1 * | 12/2005 | Greisman | A01M 23/20 | 43/60 |
| 2006/0117644 A1 * | 6/2006 | Hoyes | A01M 25/004 | 43/131 |
| 2006/0185223 A1 * | 8/2006 | Watson | A01M 23/16 | 43/61 |
| 2007/0017149 A1 * | 1/2007 | Rodgers | A01M 23/18 | 43/77 |
| 2008/0127544 A1 * | 6/2008 | Schwartz | A01M 23/24 | 43/78 |
| 2009/0151224 A1 * | 6/2009 | Nathan | A01M 23/36 | 43/81 |
| 2009/0229170 A1 * | 9/2009 | Gaibotti | A01M 25/004 | 43/131 |
| 2009/0307963 A1 * | 12/2009 | Abbas | A01M 25/004 | 43/131 |
| 2010/0050498 A1 * | 3/2010 | Nelson | A01M 31/002 | 43/60 |
| 2010/0257773 A1 * | 10/2010 | O'Dell | A01M 23/26 | 43/88 |
| 2010/0325940 A1 * | 12/2010 | Pryor | A01M 25/004 | 43/131 |
| 2012/0102821 A1 * | 5/2012 | Jovic | A01M 25/004 | 43/131 |
| 2012/0124891 A1 * | 5/2012 | Jovic | A01M 25/004 | 43/131 |
| 2013/0118056 A1 * | 5/2013 | Covington | E05B 35/008 | 70/403 |
| 2013/0174471 A1 * | 7/2013 | Vickery | A01M 25/004 | 43/131 |
| 2013/0333273 A1 * | 12/2013 | Esculier | A01M 23/005 | 43/131 |
| 2014/0190068 A1 * | 7/2014 | Walsh | A01M 23/36 | 43/78 |
| 2014/0230312 A1 * | 8/2014 | Le Laidier | A01M 23/30 | 43/77 |
| 2014/0345188 A1 * | 11/2014 | Connolly | A01M 23/02 | 43/58 |
| 2016/0073625 A1 * | 3/2016 | Walsh | A01M 23/30 | 43/77 |

FOREIGN PATENT DOCUMENTS

| | | | | |
|---|---|---|---|---|
| EP | 1057958 A2 * | 12/2000 | | A01M 25/004 |
| EP | 1306006 A2 * | 5/2003 | | A01M 23/30 |
| EP | 2100504 A2 * | 9/2009 | | A01M 25/004 |
| FR | 2564287 A1 * | 11/1985 | | |
| GB | 2063040 A * | 6/1981 | | A01M 25/004 |
| GB | 2258598 A * | 2/1993 | | A01M 23/16 |
| GB | 2394642 A * | 5/2004 | | A01M 25/004 |
| JP | 2009159938 A * | 7/2009 | | |
| WO | WO-2004030451 A2 * | 4/2004 | | A01M 23/18 |
| WO | WO-2005006857 A2 * | 1/2005 | | A01M 25/004 |

(56) References Cited

FOREIGN PATENT DOCUMENTS

| WO | WO-2009157027 A1 | * | 12/2009 | ......... A01M 25/004 |
| WO | WO-2015071571 A1 | * | 5/2015 | ............ A01M 23/30 |
| WO | WO-2019048347 A1 | * | 3/2019 | ............ A01M 23/30 |

* cited by examiner

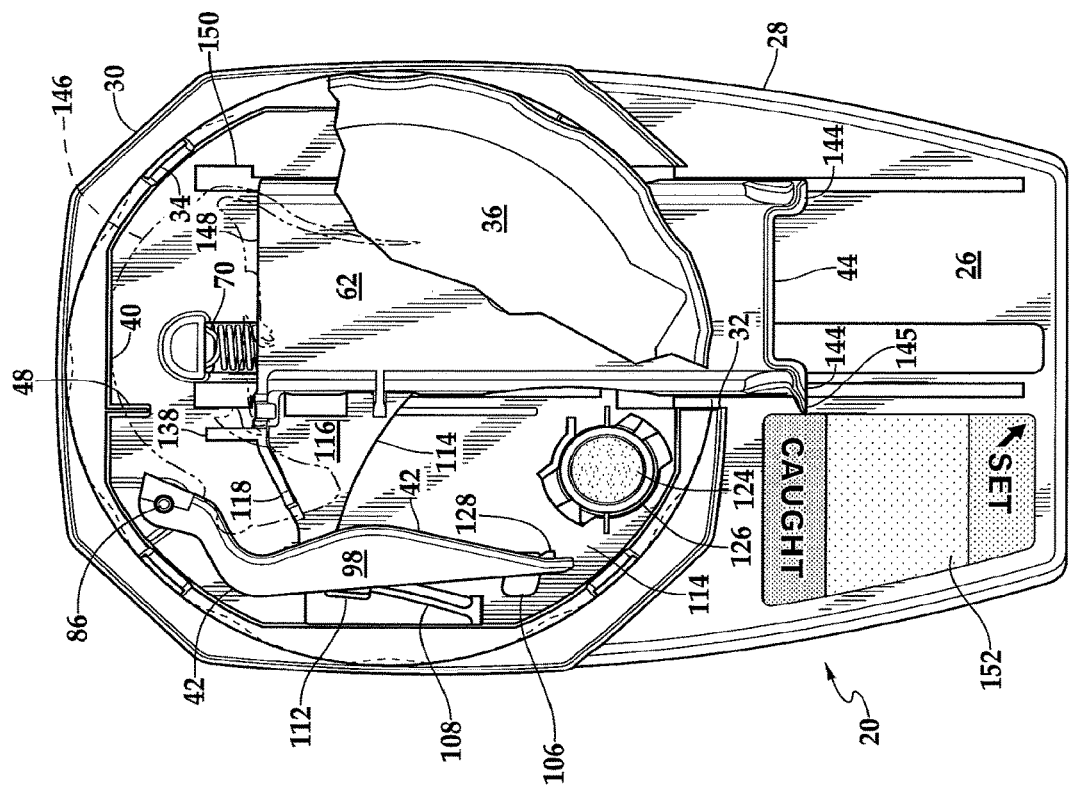
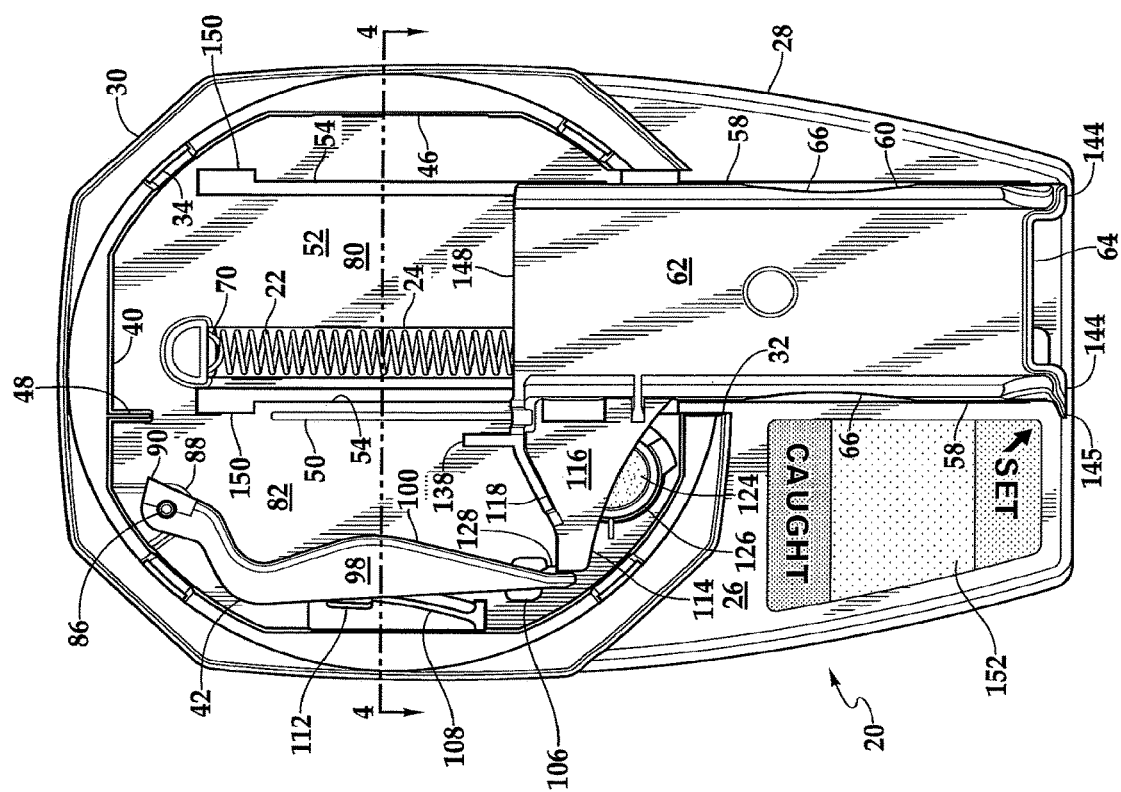

RETRACTING TUNNEL RODENT TRAP

CROSS REFERENCES TO RELATED APPLICATIONS

This application is a continuation of and claims priority to U.S. application Ser. No. 16/724,219, filed Dec. 21, 2019, now U.S. Pat. No. 11,185,066, issued Nov. 30, 2021, which is a continuation of U.S. application Ser. No. 14/946,927, filed Nov. 20, 2015, now U.S. Pat. No. 10,512,259, issued Dec. 24, 2019, which is a divisional of U.S. application Ser. No. 13/738,008, filed Jan. 10, 2013, now U.S. Pat. No. 9,220,256, issued Dec. 29, 2015, the disclosures of which are incorporated herein by reference in their entireties.

BACKGROUND

Embodiments of the present invention relate generally to rodent traps and more particularly to disposable mouse traps.

Mice within human habitations, particularly residences, present a perennial hazard to health and enjoyment of dwelling spaces. Many devices are known to capture and kill rodents. The conventional spring and bail kill trap can be very effective, but the exposed spring-loaded bail can be a hazard to pets and children. Moreover, consumers often prefer to avoid contact with the rodent once it has been killed, and for this purpose fully enclosed kill traps have been developed which freely admit rodents in a set configuration, but once triggered block off the trap entrance so that the dead rodent is not exposed, nor are the remains of the rodent able to extend from the trap. These traps provide a visual cue to their successful use, signaling the user to remove and dispose of the trap and its contents.

There is always a need for a rodent trap of this sort that, while effective, is also capable of being produced at low cost, and using automated procedures.

SUMMARY

According to an embodiment, a rodent trap includes a base, a strike member, a biasing member, and a trigger. The base defines a base interior and an opening. The strike member is movably coupled to the base for linear travel between an extended position and a retracted position. The strike member comprises a tunnel element extending through the opening of the base. The strike member defines an entryway that communicates with the base interior. The biasing member is coupled to the base and the strike member. The biasing member is configured to bias the strike member toward the retracted position. The trigger is movably coupled to the base. The trigger is configured to contact an outer surface of the strike member in the extended position. When the trigger dislodges from the outer surface of the strike member, the strike member linearly travels to the retracted position.

A rodent trap of an embodiment of this invention has a molded plastic base with a cover which defines an enclosed interior. The interior is accessible through a sliding plastic tunnel which offers a passageway with two entryways for rodents. The molded plastic tunnel has a projecting strike member, and is biased by an underlying spring to a retracted position. A trigger engaging member extends from the tunnel to be retained by the catch on a side-mounted trigger to hold the tunnel in an extended set configuration where a rodent may readily enter. When a rodent passes through the tunnel into the interior of the base, it is directed by barriers into a trigger compartment which presents a rodent attracting bait. To reach the bait, the rodent must press against a pivotably mounted trigger, thereby dislodging the trigger from the trigger engaging member which releases the tunnel to be driven by the spring to retract along parallel tracks to bring the strike plate forcibly against the rodent within the trap, usually killing it, and closing the trap, which is then presented for convenient disposal without exposing the dead rodent.

A mouse trap is provided that effectively kills mice and thereafter screens the trap contents from view.

A rodent trap is provided that is economically manufactured.

Further features and advantages of the disclosed technology will be apparent from the following detailed description when taken in conjunction with the accompanying drawings.

BRIEF DESCRIPTION OF THE DRAWINGS

FIG. 2 is a top plan view, with the lid removed, of the rodent trap of FIG. 1 in a set configuration.

FIG. 3, is a top plan view, partially broken away in section, of the rodent trap of FIG. 1 in a triggered configuration.

DESCRIPTION OF THE PREFERRED EMBODIMENTS

Figure 1:
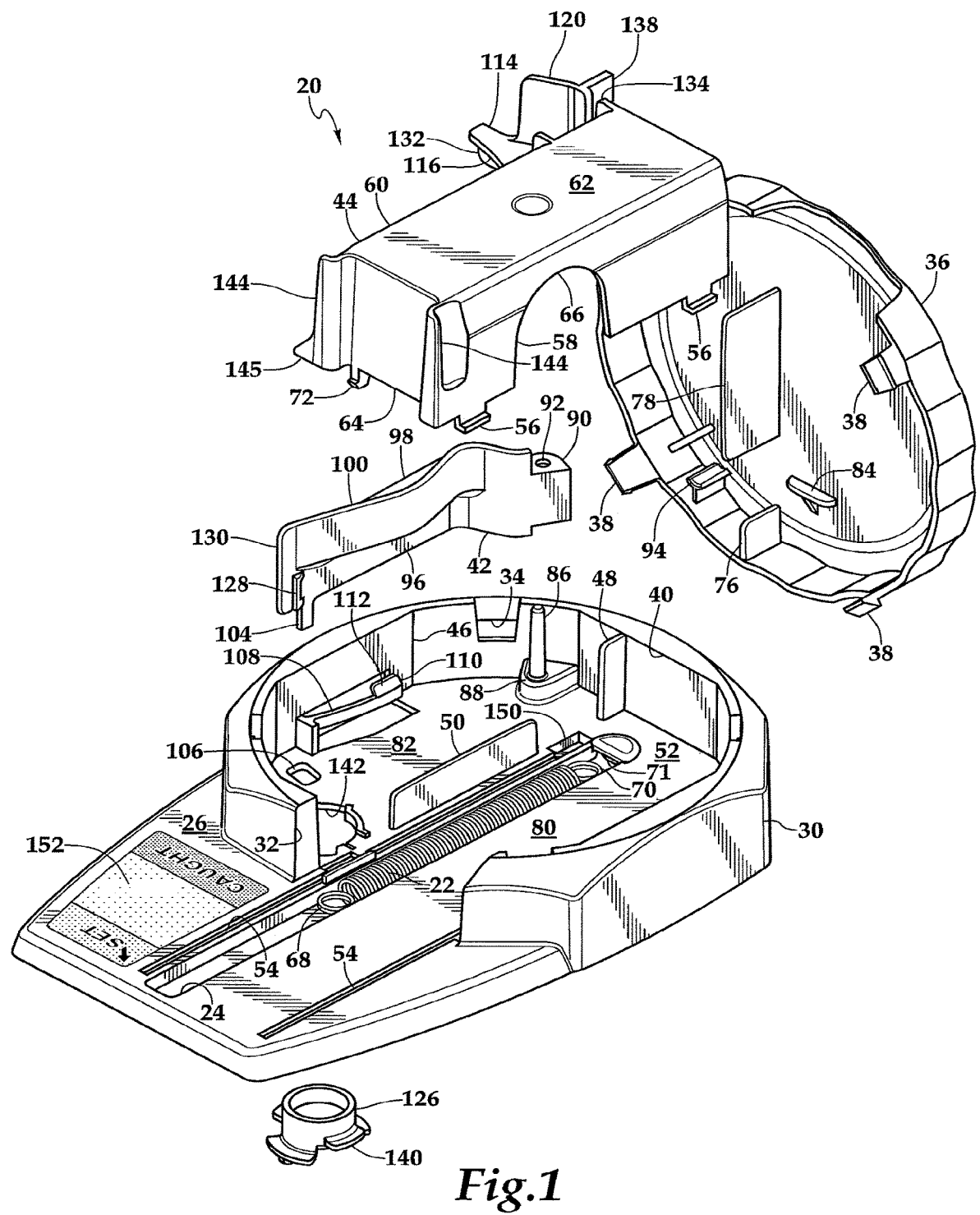
FIG. 1 is an exploded isometric view of the rodent trap of an embodiment of the present invention.

Referring more particularly to FIGS. 1-4, wherein like numbers refer to similar parts, a rodent trap 20 is shown in FIG. 1. The rodent trap is economically assembled of six parts: a metal spring 22 and five molded plastic parts. The spring 22 is received within a recessed channel 24 formed in the projecting platform 26 of a plastic base 28. The base 28 has an upwardly protruding side wall 30. The side wall 30 has a front opening 32 and a number of barb-receiving ledges 34. A plastic lid 36 has protruding barbs 38 which engage with the barb-receiving ledges 34 to fix the lid to the base and to close off the trap 20 and define a trap interior 40.

A trigger 42 is mounted within the base interior 40, and a slidable strike member 44 provides access to the base interior. As shown in FIG. 1, the base has an encircling interior wall 46 which extends around the interior. A stub wall 48 projects from the interior wall 46 rearwardly of the strike member 44, and is aligned with a lower barrier wall 50 which projects upwardly from the floor 52 of the base 28. Recessed beneath the floor 52 are two parallel guide tracks 54 which receive track-following flanges 56 which extend downwardly from the side walls 58 of a tunnel element 60 of the strike member 44. The tunnel element side walls 58 are joined to a tunnel top wall 62 and a tunnel end wall 64 to define an enclosed passageway which communicates with the trap interior 40. Each tunnel element side wall 58 has portions defining an arched opening or entryway 66, as shown in FIG. 2, which allows a rodent to enter from either side of the tunnel element. The tunnel element travels along the guide tracks under the urging of the spring when released from the trigger. The direction of tunnel element travel defines an axis, which is defined equidistant between the two side walls 58.

As shown in FIG. 1, the spring 22 has a forward loop 68 and a rear loop 70. The forward loop 68 is engaged by a hook 72 which extends downwardly from the end wall 64 of the tunnel element 60. The rear loop 70 of the spring 22 engages a spring hook 71 which protrudes downwardly from the base floor 52 adjacent the end of the spring channel 24. The spring 22 biases the strike member 44 into a retracted configuration, acting to accelerate the strike member towards a rodent within the trap 20 when the trigger 42 is tripped.

The lid 36 has a short stub wall 76 which extends downwardly close to the base stub wall 48, as well as an upper barrier wall 78 which extends near the base lower barrier wall 50. The lid and base stub walls 76, 48 and the lid and base barrier walls 78, 50, serve to define an entrance compartment 80 of the interior through which the tunnel element 60 extends, and a trigger compartment 82 within which is mounted the trigger 42.

A shallow tunnel stop 84 extends downward from the lid in a position rearward of the tunnel element 60. The tunnel stop 84 serves to limit the rearward travel of the strike member 44 by engaging the top wall 62 of the tunnel element as it moves rearwardly. As shown in FIG. 2, the trigger 42 is pivotably mounted to an upstanding pin 86 which, as best shown in FIG. 1, is supported on a platform 88 which extends from the base floor 52.

Figure 4:
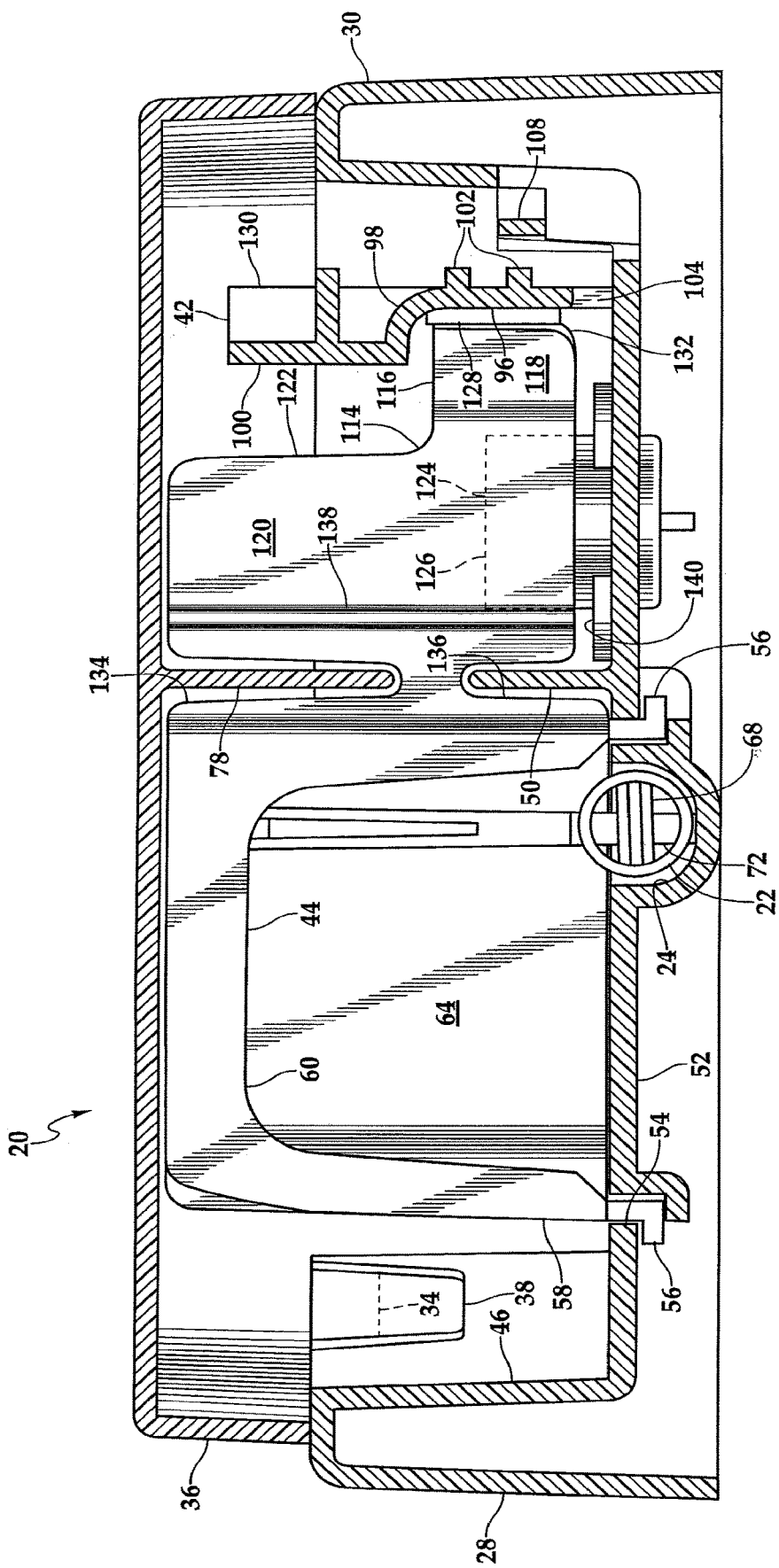
FIG. 4 is a cross-sectional view of the rodent trap of FIG. 2 taken along section line 4-4.

The trigger 42 is a molded plastic piece having two brackets 90 (only the top one being shown in FIGS. 1-3) with pin holes 92 through which the base pin 86 extends. The upper end of the pin 86 is supported against deflection in the direction of strike member movement by a protruding arc segment 94 which extends from the lid 36 adjacent the pin. The trigger 42 has a lower clearance wall 96 joined by a horizontal shelf 98 to a protruding upper wall 100, shown in FIGS. 1 and 2. The trigger 42 may be reinforced by outside ribs 102 running parallel to the shelf 98 as shown in FIG. 4. A tab 104 extends downwardly from the trigger clearance wall 96 near the end away from the brackets 90, and is received within a tab guide hole 106 formed in the floor 52 of the base 28. A spring 108 is integrally molded to protrude from the base interior wall 46 which has a free end 110, shown in FIG. 1, which engages the exterior of the trigger 42 and urges the trigger toward the strike member. The integral spring 108 may be formed with an upper lead-in ramp 112 to aid directing the trigger into place during assembly. The upper wall 100 of the trigger 42 extends into the trigger compartment 82 to narrow the compartment to increase the likelihood that a rodent passing through the compartment will engage the trigger.

As shown in FIG. 2, the strike member has a trigger engaging member 114 which projects from the strike member tunnel element 60 towards the trigger 42. The trigger engaging member 114 has a horizontal wall 116 which extends from the tunnel element 60 side wall 58 towards the trigger 42, and which joins a vertical wall 118. The vertical wall 118 extends downwardly along the entire inside edge of the horizontal wall 116, and extends upwardly to define a barrier wall 120. A clearance gap 122 is thus defined between the barrier wall 120 and the trigger upper wall 100. Through this gap 122 a rodent may detect the bait 124 contained within a removable bait cup 126, best shown in FIGS. 1 and 3. The bait cup 126 is positioned between the tunnel element 60 and the trigger 42. It is the bait which draws the rodent into the trigger compartment where it will not only activate the trigger, but also be best positioned for being struck in such a way as to be killed by portions of the strike member 44.

A catch 128 protrudes from the trigger lower wall 96 near the free end 130 of the trigger 42. The free end 132 of the vertical wall 118 of the trigger engaging member 114 abuts against the trigger catch 128, thereby holding the strike member 44 in its set position, with the tunnel element 60 extending from the trap interior 40 as shown in FIG. 2. In the set position, the strike member 44 is held against the force of the spring 22 which is urging the strike member towards its retracted configuration.

As best shown in FIG. 4, the trigger engaging member 114 is principally connected to the tunnel element 60 side wall 58 by the horizontal wall 116. An upper slot 134 and a lower slot 136 defined between the barrier wall 120 and the tunnel side wall 58 provide clearance for the upper barrier wall 78 and the lower barrier wall 50 as the strike member moves along the guide tracks 54. The lower clearance wall 96 of the trigger is recessed back from the trigger upper wall 100 to provide clearance for the trigger engaging member 114 as the strike member moves from its set configuration to a striking engagement with a captured rodent.

The strike member 44 has a vertical wall which acts as a strike plate 138 which extends in the direction of the strike member motion towards the rear of base 28. The strike plate 138 extends the full height of the barrier wall 120. As shown in FIG. 3, the strike plate 138 extends parallel to the rear barrier wall 48 but offset towards the trigger a small amount, for example about ⅛ inch. The strike plate 138 is an off-axis wall which extends towards the interior, and which is configured to strike portions of the rodent outside the tunnel element 60 when the trap 20 is triggered.

The operation of the trap 20 is illustrated in FIGS. 1 and 2. The user removes the bait cup 126 from the base 28 by rotating it to disengage the bait cup projecting flanges 140 from their engagement with the base floor 52 surrounding a bait cup opening 142 located within the trigger compartment 82. The user then places rodent bait 124, for example peanut butter, in the bait cup 126, and returns it to its position within the base 28. Because the bait cup 126 is removed and introduced through the underside of the base 28, the user need not remove the lid 36 from the trap. To set the trap, the user grips and pulls on the sidewardly projecting flanges 144 of the tunnel element 60 of the strike member 44 which are accessible exterior to the base 28. The tunnel element 60 is thus extended to reveal the two entryways 66 and the trigger engaging member 114 is brought forward until the integral spring 108 urges the trigger 42 to engage with the trigger engaging member, and thereby hold the strike member 44 in the set position as shown in FIG. 2.

One of the sidewardly projecting flanges 144 may have a protruding pointer 145, as shown in FIG. 1, which is always positioned outside the base interior and which extends over indicia 152 placed on the platform 26 of the base alongside one of the guide tracks 54. The indicia 152 may be molded into the base, or may be applied such as on an adhesive-backed label. The indicia include a region indicating that the trap is "set" as shown in FIG. 2, and another region, closer to the side wall 30 indicating that the trap has been activated and that a rodent has been "caught" as shown in FIG. 3. The words "set" and "caught" are spaced from each other in the axial direction of travel of the tunnel element 60, so that when the trap is in a position with the tunnel element extracted, the pointer 145 is near the indicium "set", and when the tunnel element is retracted substantially within the interior, the pointer is near the indicium "caught".

In the set position, the only access to the bait for a mouse 146 is through the entryways 66 and thence through a passageway 148 defined by the tunnel element 60, the lower barrier wall 50, the upper barrier wall 78, the lid 36 and the interior wall 46 on the entrance compartment 80 side of the base 28. When the mouse 146 enters the passageway 148, it must progress through the tunnel and then make a turn into the trigger compartment 82. As shown in FIG. 4, when the mouse looks into the trigger compartment the bait 124 is directly ahead, but shielded by the wall 118 of the trigger engaging member. The gap 122 presents a route to the bait 124. As the mouse moves towards the gap 122, it will engage against and displace sidewardly the upper wall 100 of the trigger 42, thereby causing the trigger to pivot about the pin 86 and releasing the trigger catch 128 from the free end of the 132 of the trigger engaging member 114 of the strike member 44. Once released from the trigger, the spring 22 accelerates the strike member along the axial path defined by the guide tracks 54 towards the rear of the base 28.

As shown in FIG. 3, this rapid retraction of the strike member brings the vertical wall 118 and the strike plate 138 into contact with the mouse 146 and forcibly displaces it towards the rear of the base. Because the mouse's head was within the trigger compartment when the trigger was engaged, it is likely that the strike plate 138 will crush the torso of the mouse 146 between the strike plate 138 and the wall 48 at the rear of the base, usually causing death. The tunnel element 60 may be a little more than 3 inches long. Because the mouse is partially within the trigger compartment when struck, there is adequate space within the trap to entirely contain the rodent's remains so that none will project beyond the trap interior. The retracted tunnel element 60 gives an easily perceived signal to the user that a mouse has been caught. The trap 20 and the mouse therein may then be disposed of by the user without the need to ever come directly in contact with the mouse remains.

It is understood that the disclosed invention is not limited to the particular construction and arrangement of parts herein illustrated and described, but embraces all such modified forms thereof as come within the scope of the following claims.

What is claimed is:

1. A rodent trap comprising:
   a base defining a base interior and an opening;
   a strike member movably coupled to the base for linear travel between an extended position and a retracted position, the strike member comprising a tunnel element extending through the opening of the base and into the base interior, the tunnel element defining an entryway that communicates with the base interior, wherein the entryway is exterior to the base interior when the strike member is in the extended position;
   a biasing member coupled to the base and the strike member, the biasing member configured to bias the strike member toward the retracted position; and
   a trigger pivotably coupled to a pin extending vertically from the base, wherein the trigger is configured to contact an outer surface of the strike member in the extended position and, when the trigger dislodges from the outer surface of the strike member, the strike member linearly travels to the retracted position.

2. The rodent trap of claim 1, wherein the entryway is in the base interior when the strike member is in the retracted position.

3. The rodent trap of claim 1, wherein the trigger and the strike member are spaced apart when the strike member is in the retracted position.

4. The rodent trap of claim 1, wherein the strike member has a trigger engaging member that projects from an outer side of the tunnel element of the strike member, wherein the outer surface of the strike member includes an outer surface of the trigger engaging member, the trigger engaging the outer surface of the trigger engaging member when the strike member is in the extended position.

5. The rodent trap of claim 1, wherein the base includes a platform projecting beyond the base interior.

6. The rodent trap of claim 5, wherein the base includes a base floor, the platform extending from the base floor, and wherein the strike member linearly travels along the platform and the base floor to the retracted position.

7. The rodent trap of claim 5, wherein the biasing member comprises a spring, and the platform of the base defines a channel that receives the spring.

8. The rodent trap of claim 1, wherein a guide track is formed in the base to receive a projection from the strike member to guide it along a desired path.

9. The rodent trap of claim 1, further comprising a trigger spring biasing the trigger towards the strike member.

10. The rodent trap of claim 1, wherein the tunnel element defines a passageway that communicates with the base interior, and the trigger is spaced outside of the passageway and sidewardly from the tunnel element.

11. The rodent trap of claim 1, wherein the base defines within the base interior an entrance compartment and a trigger compartment, the trigger compartment being alongside the entrance compartment and in communication therewith, wherein the tunnel element of the strike member extends into the entrance compartment and the trigger is in the trigger compartment.

12. The rodent trap of claim 11, wherein the trigger includes a trigger catch, the outer surface of the strike member includes a trigger engaging member that engages the trigger catch, wherein the trigger engaging member has a horizontal wall projecting from an exterior side wall of the strike member from the entrance compartment into the trigger compartment, and a vertical wall extending upwardly from the horizontal wall to face towards a rodent entering the trigger compartment from the entrance compartment, the vertical wall being in the trigger compartment.

13. The rodent trap of claim 12, wherein a strike plate extends from the vertical wall of the trigger engaging member, and the strike plate is positioned to strike the rodent within the base interior when the trigger is triggered.

14. The rodent trap of claim 11, further comprising a lid connected to the base, the lid having a lid barrier wall extending downwardly into the base interior, and wherein the base has a base barrier wall extending upwardly into the base interior, the lid barrier wall and the base barrier wall extending between the entrance compartment and the trigger compartment.

15. The rodent trap of claim 1, further comprising a bait cup positioned within the base interior between the trigger and the strike member.

16. The rodent trap of claim 1, further comprising:
   indicia associated with the base to indicate whether the rodent trap is set with the strike member in the extended position or has been activated with the strike member in the retracted position, the indicia associated with the base comprising first indicia to indicate the rodent trap is set and second indicia to indicate the rodent trap has been activated, the first and second indicia being spaced from one another; and
   indicator portions of the strike member extending outside the base interior and pointing to one of the spaced first and second indicia depending on whether the strike member is in the extended position or the retracted position.

17. The rodent trap of claim 1, wherein:
the base has a guide track extending outside the base interior;
the tunnel element is mounted to the base, the tunnel element further comprising portions extending into the guide track, wherein the tunnel element is mounted for travel on the base between the extended position in which the entryway is accessible by a rodent when it is exterior to the base interior, and the retracted position;
the biasing member comprises a spring extending between the base and the tunnel element;
the spring biases the tunnel element towards the retracted position; and
the tunnel element is configured to travel, guided by the guide track, to the retracted position under the urging of the spring, such that the tunnel element will strike portions of the rodent upon release of the strike member by dislodgement of the trigger by the rodent.

18. The rodent trap of claim 17, wherein the base has a platform projecting beyond the base interior, and wherein the guide track is formed on the platform of the base.

19. The rodent trap of claim 1, wherein a rodent moving through the entryway into the base interior and against the trigger will dislodge the trigger from the outer surface of the strike member to release the strike member to linearly travel to the retracted position.

* * * * *